United States Patent [19]
Hoffmann et al.

[11] Patent Number: 5,036,648
[45] Date of Patent: Aug. 6, 1991

[54] CUTTERHEAD FOR A VEGETATION CUTTER APPARATUS

[75] Inventors: Joachim Hoffmann, Aichwald; Dieter Angstenberger, Leutenbach; Joachim Kottke, Remseck, all of Fed. Rep. of Germany

[73] Assignee: Andreas Stihl, Waiblingen, Fed. Rep. of Germany

[21] Appl. No.: 521,428

[22] Filed: May 10, 1990

[30] Foreign Application Priority Data

May 17, 1989 [DE] Fed. Rep. of Germany ....... 3916009

[51] Int. Cl.$^5$ .................. A01D 50/00; A01G 3/06
[52] U.S. Cl. ..................... 56/12.1; 56/12.7; 30/DIG. 5
[58] Field of Search ............ 56/233, 12.1, 12.7, 56/1; 30/276, 289, 347, DIG. 5

[56] References Cited

U.S. PATENT DOCUMENTS

| | | | |
|---|---|---|---|
| 4,195,408 | 4/1980 | Palmieri et al. | 30/276 |
| 4,366,622 | 1/1983 | Lombard | 56/12.7 |
| 4,651,421 | 3/1987 | Zerrer | 56/12.7 |
| 4,866,846 | 9/1989 | Hoffmann et al. | 56/12.7 |

FOREIGN PATENT DOCUMENTS

2855990 7/1980 Fed. Rep. of Germany .

Primary Examiner—Terry Lee Melius
Attorney, Agent, or Firm—Walter Ottesen

[57] ABSTRACT

The invention relates to a cutterhead for vegetation cutter apparatus and has as its object to configure the cutterhead so that the cutterhead as a unit can be built so as to be overall constructively small and reduce wear. The cutterhead controls the spool having the filament with the aid of a latching lever. To achieve an overall construction which is small and subjected to less wear, the invention provides at least one pivot lug fixedly mounted on the housing having its latching lever arranged in an annular space lying concentric to the rotational axis between the hub of the cutterhead and the switching cams corresponding to the filament spool. These switching cams lie in the outer radial region of the spool.

25 Claims, 4 Drawing Sheets

CUTTERHEAD FOR A VEGETATION CUTTER APPARATUS

FIELD OF THE INVENTION

The invention relates to a rotatably driven cutterhead for a vegetation cutter apparatus having a housing, a spool rotatably journalled on a hub of the housing and an indexing mechanism for permitting an incremental rotation of the spool relative to the housing to pay out incremental lengths of a flexible cutting filament wound on the spool.

BACKGROUND OF THE INVENTION

A cutterhead of this type is known from published German patent application DE-OS 28 55 990. In this cutterhead, the flexible cutting filament, for example a plastic filament, is wound on the spool. The plastic filament is consumed by wear during operation and is thereby shortened. The plastic filament is readjusted by a predetermined length via a coupling part corresponding to the spool and the housing and this coupling part is in the form of a pivotally journalled lever biased by centrifugal force. The coupling part is configured as a two-arm lever in the manner of a rocker having a pivot axis which lies outside of the center of gravity. The bifurcated coupling part has two prong-like cams with which the coupling part engages in catch recesses in a first and in a second catch position. The catch recesses are configured by cam-like catches which are provided inside on the take-up spool for the cutting filament.

In this known embodiment, the coupling member includes the two prong-like catches and is provided for a bearing pin in the outer region of the cutterhead housing with the bearing pin being provided on the housing. In this way, a relatively unwieldy or large configuration for the cutterhead is provided. Furthermore, the coupling member is pivotally mounted outwardly and together with its journalling support influences in a very unfavorable manner the unbalancing conditions of the cutterhead running at very high rotational speed.

It is characteristic for the species of the above-mentioned known cutterhead that the cutting filament wound on the spool is readjusted without intervention of the operator, that is without manipulation by the operator. The readjustment takes place automatically in dependence on the magnitude of the centrifugal force and in a stepwise manner with the wear of the cutting filament; however, the cutting filament is not guided over the pivotable coupling member. The coupling member causes the spool to rotate through a rotational segmental distance relative to the housing in dependence on centrifugal force thereby releasing a pregiven length of the cutting filament. The cutting filament is however not guided via the pivotable coupling member. In this way, the coupling member is not itself directly biased by the cutting filament and is not directly influenced by the filament, for example, by friction. The switching cams in the known cutterhead lie within the spool. These switching cams like the prong-like cams must have very tight tolerances in order to effect a precise switching which besides being relatively expensive in manufacture is also disadvantageous because of a high surface pressure. The prong-like cams operate with the switching cams and are provided on the pivotable coupling member.

SUMMARY OF THE INVENTION

It is an object of the invention to provide a cutterhead which can be held small in size and yet hold the pressing forces and switching forces optimally small while obtaining a more favorable balance of masses. The small size configuration is achieved by configuring and arranging the indexing elements, that is, the coupling member and the spool switching cams which coact with the coupling member. The pressing forces and switching forces occur during automatic switchover of the filament spool from its latched position into its release position in which the filament is unwound in a stepwise manner.

The cutterhead of the invention is for a rotatably-driven vegetation cutter apparatus defining a drive axis about which the cutterhead is rotatably driven. The cutterhead includes: a housing adapted to be rotatively driven by the vegetation cutter apparatus about the drive axis; the housing having a hub formed thereon so as to extend along the drive axis; a spool defining a radial outer region and being rotatably journalled on the hub for carrying a flexible cutting filament wound thereon; indexing means for permitting an incremental rotation of the spool relative to the housing to pay out incremental lengths of the cutting filament, the indexing means including: a plurality of switching cams arranged on the spool in the radial outer region thereof so as to cause the cams and the hub to conjointly define an annular space concentric to the drive axis; a pivot lug fixedly mounted on the housing so as to be parallel to the drive axis; a latching lever pivotally mounted on the pivot lug so as to be pivotally movable between a latching position wherein the latching lever is in contact engagement with one of the cams so as to prevent a rotational movement of the spool with respect to the housing and a release position into which the lever is moved in dependence on centrifugal force to release the spool for movement relative to the housing to pay out an incremental length of the filament; and, the pivot lug being mounted on the housing so as to cause the pivot lug and the latching lever to be arranged in the annular space between the hub and the cams.

The switching cams coact with the pivotable coupling part, namely a latching lever. According to a feature of the invention, the switching cams are mounted outwardly on the outer edge of the spool or of the cutterhead housing. A desired small configuration of the cutterhead is possible because the switching cams are mounted at the outer edge of the spool or cutterhead housing and the pivot lugs including the latching levers are arranged in the annular space lying concentric to the rotational axis and between the hub of the housing and the radial outer region of the spool. More construction space is available because of the arrangement of the switching cams radially outside of the latching lever. For this reason, the switching cams themselves and especially their stop faces which are subjected to high surface pressure can be favorably manufactured and favorably configured with respect to low wear. In this way, it is also possible to return the latching lever reliably from the release position into the latching position with high switching precision.

In another embodiment of the invention, the released cutting filament unwound from the spool is guided through at least one redirecting yoke provided on the housing and ahead of its pass-through opening in the housing leading to the outside. A filament guided via such a redirecting yoke is subjected to increased friction so that the filament force acting on the spool is reduced. This filament force is generated by the centrifugal force acting on the filament.

The cutterhead according to the invention is further so configured that its rotational direction (clockwise or counterclockwise) can at any time be changed in a simple manner by simply reversely inserting the latching lever and the filament redirecting yoke.

BRIEF DESCRIPTION OF THE DRAWINGS

The invention will now be described with reference to the drawings, wherein.

DESCRIPTION OF THE PREFERRED EMBODIMENTS OF THE INVENTION

The cutterhead 1 is part of a vegetation cutter apparatus not shown in the drawing with the cutterhead being preferably used for cutting grasses or the like. The cutterhead is driven by the motor of the vegetation cutter apparatus and rotates about the rotational axis 2 shown in FIG. 1. The cutterhead 1 has an approximately pot-shaped configured housing 3 with a base wall 3' lying on the operating end as well as a receptacle 4' for the motor shaft and a hub 4. A cover 5 lies opposite the base wall 3' and can be seated on the cylindrical peripheral wall 13 of the housing 3. The cover 5 has a screw thread 6 in the embodiment shown.

In the housing 3, a spool 8 is rotatably journalled on the peripheral surface 9 of the hub 4 so as to be coaxial to the drive axis 2. The spool 8 is rotatably journalled in such a manner that it can rotate into a released position relative to the housing. A cutting filament 10 is wound on the spool 8 and can for example be a plastic cord. The part 11 unwound from the spool is passed through an opening 12 in the housing 3. This opening is provided with a bushing 14 for guiding the filament as it passes through the opening.

Figure 5:
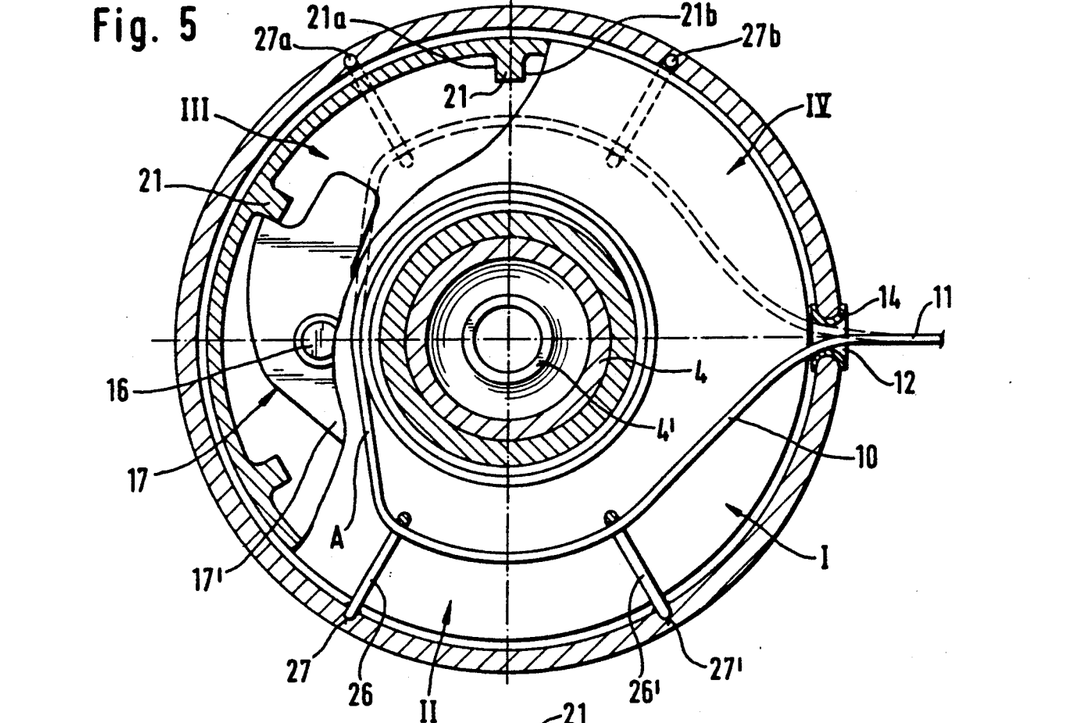
FIG. 5 is a section view corresponding to FIG. 4 but showing the cutterhead provided with a guide configured by redirecting yokes for guiding the cutting filament.
Figure 6:
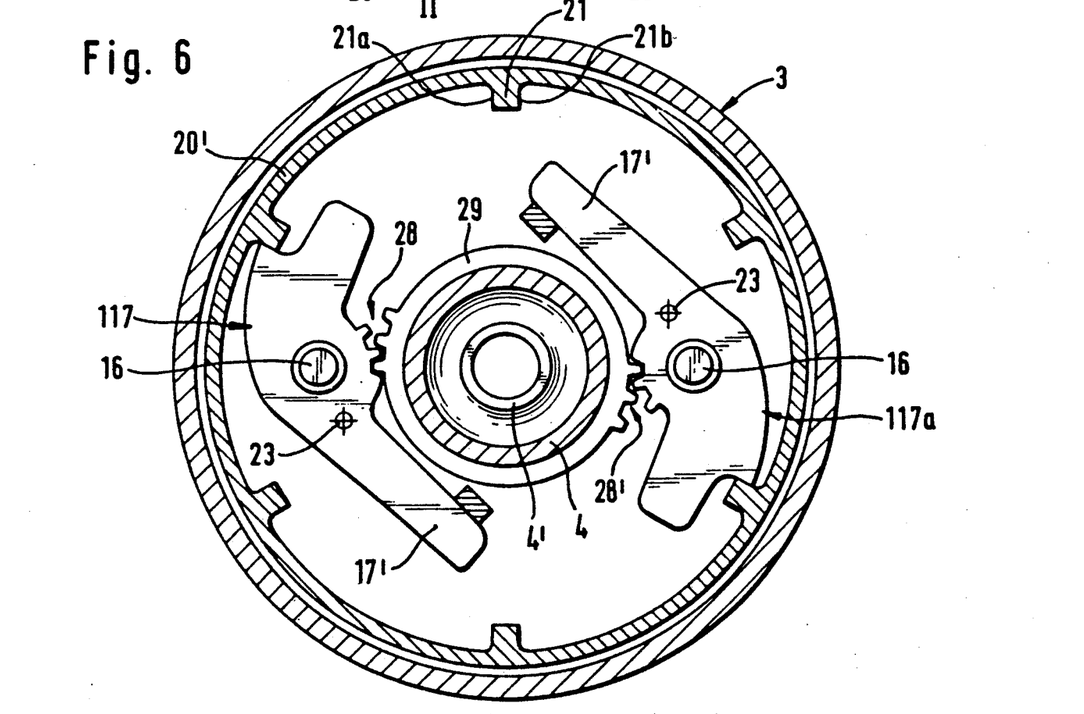
FIG. 6 is a section view taken along a line corresponding to line II—II of FIG. 1 but with the cutterhead having two latching levers arranged symmetrically with respect to each other.

In the embodiment of FIGS. 1 to 5, a pivot lug 16 for the latching lever 17 is formed on the base wall 3' of the housing 3 lying opposite the cover 5. The pivot lug 16 projects into the housing and the latching lever forms a centrifugal-force dependent coupling member between the spool 8 and the housing 3. In the embodiment of FIG. 6, two pivot lugs (16, 16) are provided and are disposed diametrically opposite each other. One or more latching levers can be rotatably mounted on the pivot lug 16 against an expanded shoulder 16' of the pivot lug and a circlip 15.

The spool 8 has an upper flange 20 facing toward the drive end of the cutterhead and a flange 19 disposed in the vicinity of the cover 5. The cutting filament 10 lies wound in several layers between these flanges.

As shown in the drawings, a latching lever 17, shown as having two arms in the embodiment, is arranged on the pivot lug 16 fixed to the housing. The latching lever 17 can go through a back and forth rotating pivot movement in the direction of arrow 25 (see FIG. 2) under the centrifugal force acting thereon.

In the preferred two-arm embodiment of the latching lever 17, the latching lever has a somewhat radially inwardly directed stop face 17a in its forward section which effects the latching of the spool. The stop face 17a coacts with the switching cams 21 of the spool 8 in such a manner that the spool 8 in one position is blocked as to a self rotation with respect to the housing 3 as a consequence of the contact engagement of the stop face 17a on the corresponding counter face 21a of the switching cam 21 provided on the outer periphery of the spool. This is shown in FIGS. 3 to 6. In the other position (see FIG. 2), the latching lever is disposed with its stop face 17a within the switching cam 21 arranged rim-like over the outer region of the spool so that in this inner position of the latching lever 17, a rotational movement of the spool 8 against the rotational direction $F_1$ (see arrow $F_2$ in FIG. 2) is possible.

The latching lever 17 can move through a limited pivot movement about its pivot lug 16 under the centrifugal force acting thereon so that a rotation of the spool 8 with respect to the housing 3 is accompanied by a segment-like release of the cutting filament which likewise is subjected to centrifugal force. The release of the cutting filament is in correspondence to a corresponding wearing down thereof. This is achieved in that the pivot lug 16 and the latching lever 17 are mounted in the annular space R between the hub 4 and the switching cams 21 provided in the radially outer region of the spool 8. The annular space R lies concentric to the rotational axis 2 of the cutterhead.

In the embodiment of the cutterhead shown, the center of gravity 23 of the two-arm latching lever 17 lies outside of the pivot lug and on a reset arm 17' integrally formed to a lever with the latching section of the latching lever 17. The arrangement is so configured that when a specific limit value of the centrifugal force is exceeded, the reset arm 17' is moved under the action of this centrifugal force torque outwardly in the direction of arrow $r_1$. In this way, the stop face 17a of the latching part of the latching lever 17 is moved inwardly toward the hub 4 and the counter face 21a of the switching cam 21 of the spool is released so that the spool now rotates freely opposite the rotational direction $F_1$ of the housing and the cutting filament (11, 10) biased by centrifugal force can be released. The centrifugal force defining the above limit value thereof acts on the latching lever and at the center of gravity 23 of the latching lever 17.

In the blocked position of the spool 8, the stop face 17a of the latching lever lies against the counter face 21a of the switching cam. The blocked position of the spool 8 shown in FIGS. 3 to 6 is reached when a predetermined cutting length of the cutting filament segment 11 is present and the centrifugal force acting thereon applies a torque to the spool 8 which can be designated the spool force and which is greater than the resultant centrifugal force acting on the latching lever 17. In this case, the latching lever 17 is disposed in the latched position corresponding to FIGS. 3 to 6 since the centrifugal force acting thereon for a pulled out filament length does not generate an adequately large torque about its center of gravity 23 to overcome the pressing force of the spool 8 between the counter face 21a and the stop face 17a of the latching lever.

If the exposed cutting length of filament 11 becomes shortened as a consequence of wear, the centrifugal force acting on the spool 8 becomes less and therewith the pressing force present at the faces 21a and 17a compared to the centrifugal force torque acting on the latching lever. The switchover from the latch position (see FIG. 3) into the inner release position of the latching lever (see FIG. 2) occurs when the centrifugal force torque acting on the latching lever 17 is greater than the torque acting on the spool via the cutting filament.

It is advantageous to limit the path of the latching lever 17 which makes possible the release of the spool 8, by means of stops 22, 22' with a stop 24 being defined by a stop face formed on the latching lever 17. The inner cams 22, 22' are advantageously provided in the region of the hub 4 and project preferably radially beyond the hub 4.

It is further purposeful to also limit the reset path of the reset arm 17' directed outwardly by a corresponding contact engagement of the reset arm 17' on the switching cam 21.

An embodiment is especially advantageous wherein the reset arm 17' is longer than the latching section of the latching lever 17 having the stop face 17a. In this way, a precise switching of the reset lever is obtained independently of different friction conditions even for short exposed filament segments.

Figure 1:
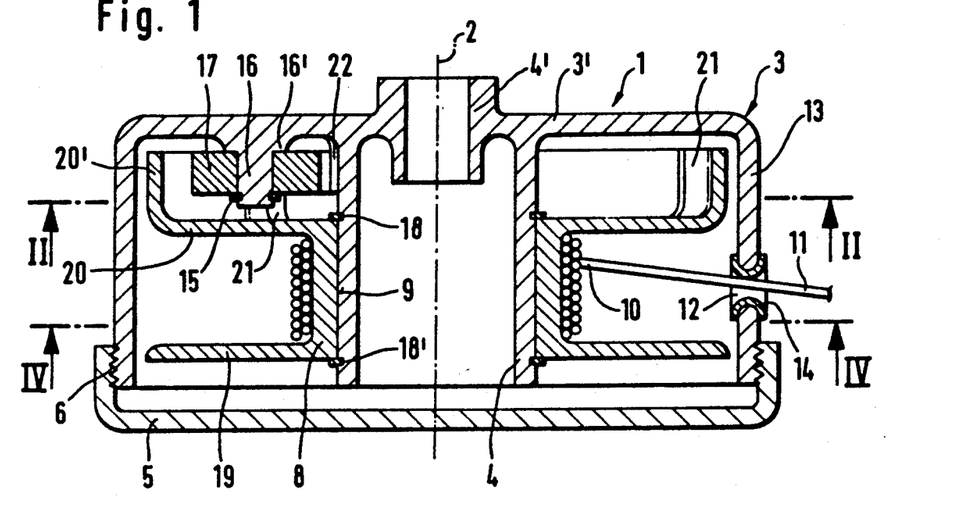
FIG. 1 is an axial section view of an embodiment of the cutterhead of the invention taken along the line I—I of FIG. 2.
Figure 2:
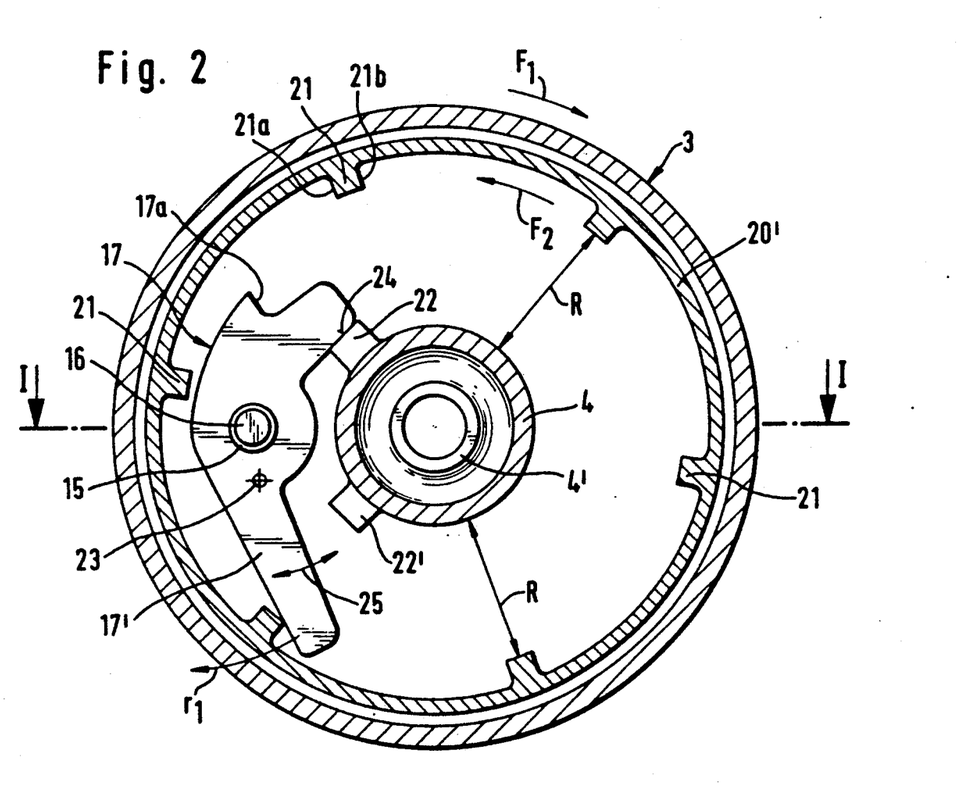
FIG. 2 is a section view taken along line II—II of FIG. 1 showing the latching lever pivoted inwardly in its release position wherein the spool has been released to permit a rotational movement thereof relative to the cutterhead housing.
Figure 3:
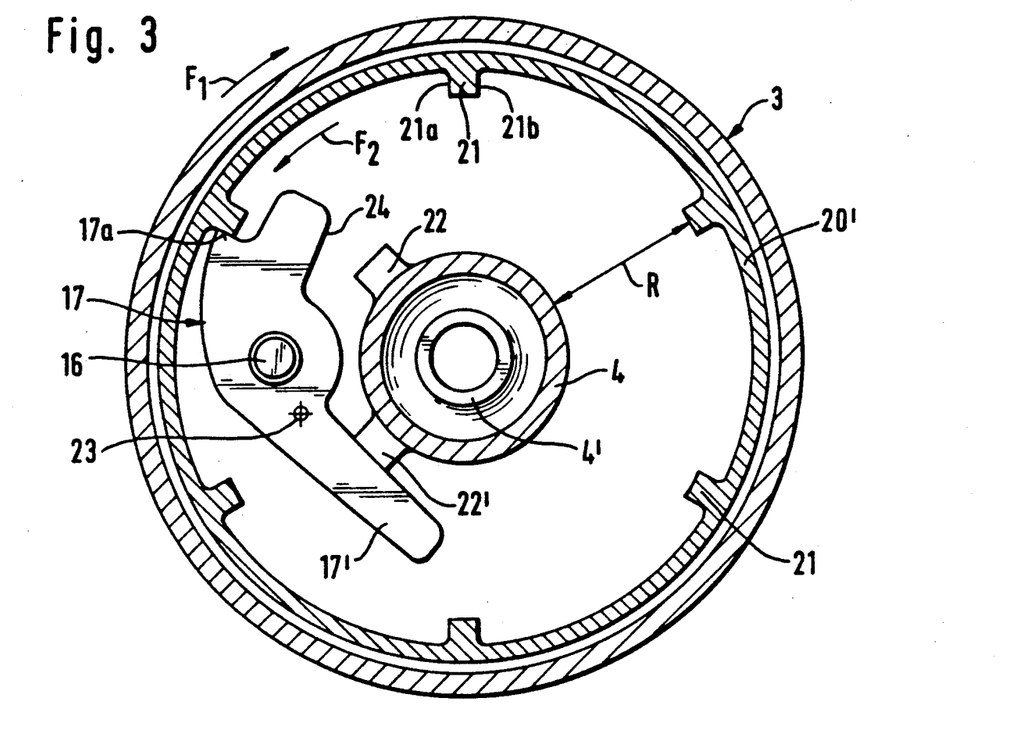
FIG. 3 is a section view taken along line II—II of FIG. 1 but showing the latching lever disposed in its latched position for latching the spool.
Figure 4:
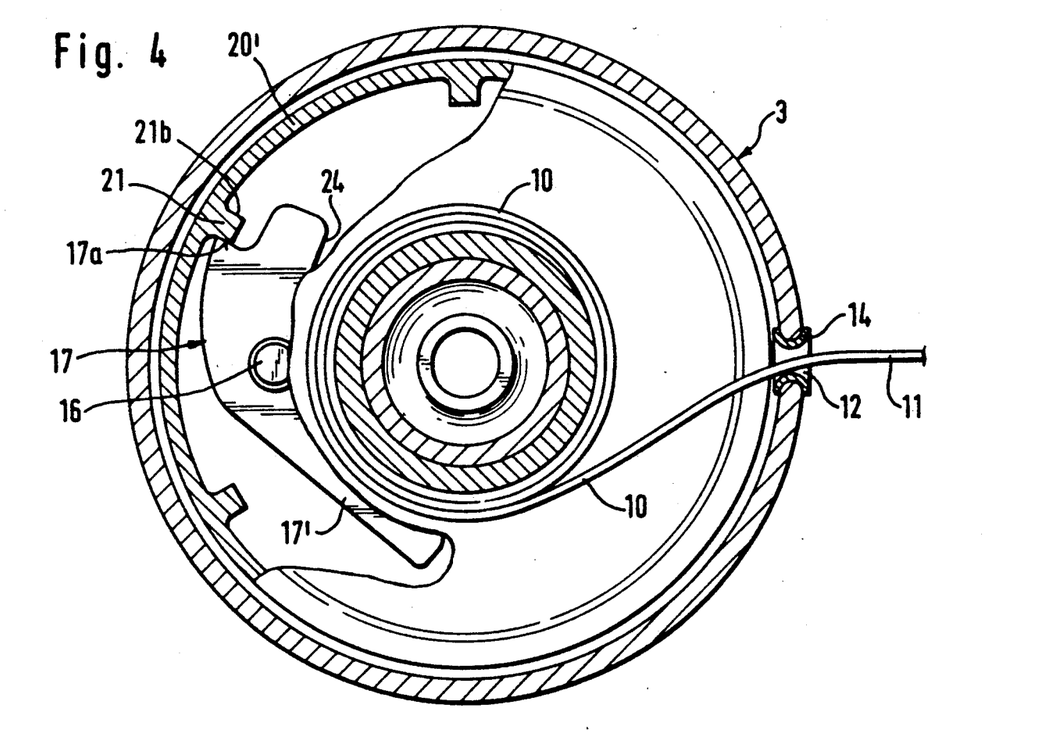
FIG. 4 is a section view taken along line IV—IV of FIG. 1 with a portion of a flange of the spool broken away to show the switching cams and latching lever with the spool shown in the blocked position corresponding to FIG. 3.

A further advantageous embodiment is obtained when the upper flange 20 facing the base wall 3' of the housing 3 has a pulled up peripheral rim 20' lying approximately parallel to the axis 2 and surrounding the one or more latching levers 17 (see FIG. 1). In this way, a possibility for the mounting and configuration of the switching cams 21 of the spool 8 is obtained which is of simple construction and simple to manufacture. In addition, the upwardly pulled rim 20' also provides protection for the switching mechanics defined by the switching cam 21 and the pivotable latching lever 17. Furthermore, a configuration of the switching cams at this peripheral rim is assured which is of simple construction and simple to manufacture. The switching cams 21 are arranged in uniform spacing over the entire outer periphery of the spool. The advantage of this arrangement lies in the possibility to configure the cutterhead smaller and to reduce the switching forces and thereby the surface pressure between 17a and 21a whereby the cutterhead is stressed less in the region of the switching elements. The switching forces and therewith the surface pressure is reduced as a consequence of the outwardly displaced arrangement of the switching cams. In addition, a considerable reduction in the switching forces and therewith the resistance to wear of the cutterhead as well as a higher switching precision is obtained by the position of the pivot lug 16 together with the latching lever 17 within the peripheral circle of the switching cam 21.

In the cutterhead according to the invention, the cutting filament 10 taken off the spool can be guided in the housing 3 in such a manner that it is subjected to increased friction during operation. In this way, the filament force acting on the spool via the pulled off filament (10, 11) is reduced in a desired manner so that undesired heating of the filament as a consequence of increased wear or friction which is too intense and a welding of the wound filament can thereby be avoided. This can be achieved independently of the above-described configuration of the cutterhead in that at least one or two redirecting yokes 26 or 26' are mounted between the take-off location (see FIG. 5) of the cutting filament 10 and its pass-through opening 12 in the housing 3 with the cutting filament 10 being guided over the redirecting yokes.

The above arrangement is advantageously configured in that a redirecting yoke 26 is provided in the quadrant I of the housing 3 lying closest to the pass-through opening 12 and a second yoke 26' is provided in the quadrant II (see FIG. 5) directly adjacent to the first quadrant in the region of the take-off location A of the cutting filament 10. In such an arrangement of the filament redirecting yokes, an optimal reduction of the filament force is obtained by utilizing the wrap-around friction whereby filament wear is reduced on the one hand because of the reduced filament pulling force and, on the other hand, the forces acting on the spool 8 and the switching cams are likewise reduced so that the switching mechanism as a unit is relieved of stress.

Furthermore, the arrangement and configuration of the described redirecting yokes 26, 26' in the form of simple wire yokes afford the possibility to mount the same in a manner which is advantageous to manufacture and assemble in that simply receiving openings 27, 27' are provided in the housing into which the wire yoke ends can be inserted in a simple manner.

Figure 7:
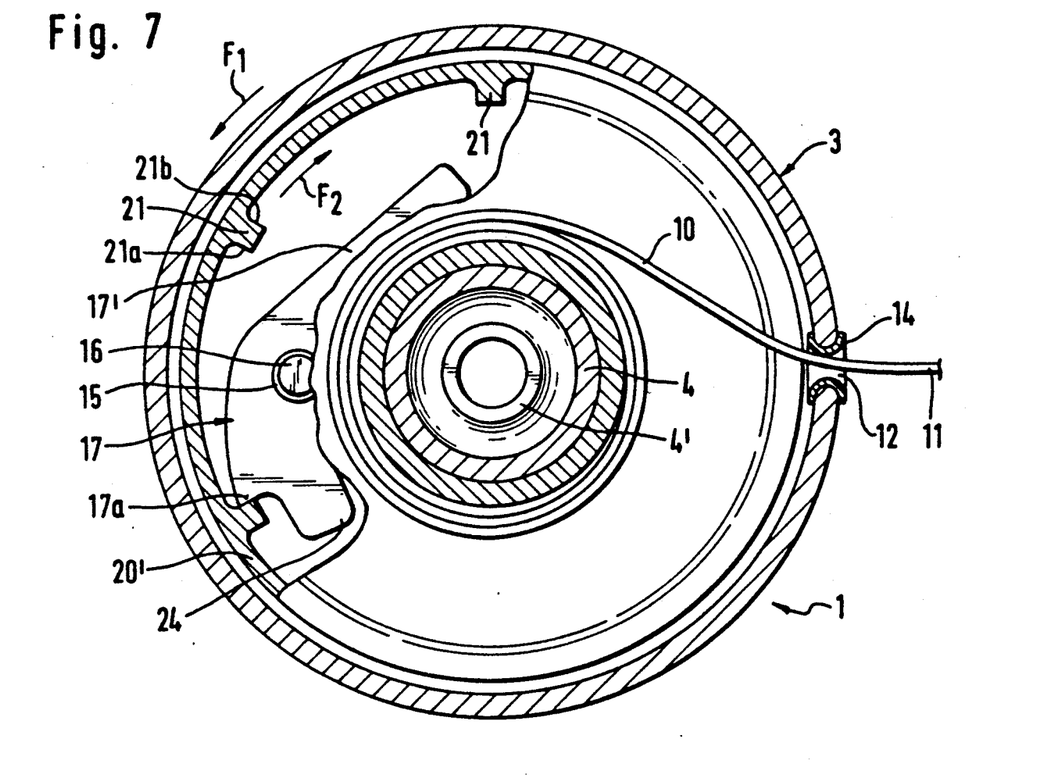
FIG. 7 is a section view of the cutterhead of FIG. 3 in the latched position but with the latching lever reversed in position by 180° and mounted on its pivot lug for the left rotation of the cutterhead.

The cutterhead described can furthermore be so configured that its rotational direction (clockwise or counterclockwise) can be changed in a simple manner. For this purpose, additional receiving openings (27a, 27b) are provided in the cutterhead, especially in the housing, and in the spool in the remaining quadrants of the cylindrical cutterhead. In the embodiment of FIG. 5, these receiving openings can be provided in the quadrants III and IV. For such a configuration and for a reversal of rotational direction of the cutterhead 1, the latching lever 17 can be turned over 180° and mounted on its pivot lug 16. The switching cams 21 are configured with a further stop face, namely, with a counter face 21b for the opposite running direction of the cutterhead (see FIG. 7).

In the further embodiment of the cutterhead shown in FIG. 6, two identically configured latching levers 117, 117a are provided symmetrical to each other. Also, more than two such latching levers can be mounted symmetrically to each other in the cutterhead. The latching levers are connected so as to work synchronously with each other via interlocking means, preferably via respective meshed gearings (28, 28'). By distributing the forces over several latching levers, a desired reduction of the surface pressure on the stop surfaces (17a, 21a) between latching lever 17 and cam 21 is obtained. In addition, with an arrangement of two or more latching levers, a forced synchronization of the switching operation and therefore a very high precision with a simultaneous reduction of switching forces (especially for large cutterheads having several cutting filaments) as well as a favorable balance of masses is obtained.

For an embodiment having several latching levers, the arrangement can further be so configured that the premeshed gearing (28, 28') provided on the inner side of the latching lever can work with counter teeth which are provided on the intermediate ring 29 positioned about the hub 4.

It is understood that the foregoing description is that of the preferred embodiments of the invention and that various changes and modifications may be made thereto without departing from the spirit and scope of the invention as defined in the appended claims.

What is claimed is:

1. A cutterhead for a rotatably-driven vegetation cutter apparatus defining a drive axis about which the cutterhead is rotatably driven, the cutterhead comprising:

a housing adapted to be rotatively driven by the vegetation cutter apparatus about said axis;

said housing having a hub formed thereon so as to extend along said axis;

a spool defining a radial outer region and being rotatably journalled on said hub for carrying a flexible cutting filament wound thereon;

indexing means for permitting an incremental rotation of said spool relative to said housing to pay out incremental lengths of the cutting filament, said indexing means including:

a plurality of switching cams arranged on said spool in said radial outer region thereof so as to cause said cams and said hub to conjointly define an annular space extending in surrounding relationship to said axis;

a pivot lug fixedly mounted on said housing so as to be parallel to said axis;

a latching lever pivotally mounted on said pivot lug so as to be pivotally movable between a latching position wherein said latching lever is in contact engagement with one of said cams so as to prevent a rotational movement of said spool with respect to said housing and a release position into which said lever is moved in dependence on centrifugal force to release said spool for movement relative to said housing to pay out an incremental length of the filament;

said latching lever being mounted on said pivot lug so as to be pivotally movable unrestrained into said release position exclusively in response to said centrifugal force; and, said pivot lug being mounted on said housing so as to cause said pivot lug and said latching lever to be arranged in said annular space between said hub and said cams.

2. The cutterhead of claim 1, said latching lever being a two-arm lever having first and second arms extending outwardly from said pivot lug in respective directions, said first arm having a stop face formed thereon and each of said cams having a counter face formed thereon for coacting with said stop face when said latching lever is in said latching position; and, said second arm being a reset arm for responding to centrifugal force so as to cause a pivotal movement of said latching lever into said release position.

3. The cutterhead of claim 2, said stop face and said counter face each extending approximately radially.

4. The cutterhead of claim 2, said lever having a center of gravity located on said reset arm in spaced relationship to said pivot lug so as to cause said reset arm to swing outwardly and said first arm to swing inwardly when said centrifugal force exceeds a predetermined value thereby releasing said spool to rotate relative to said housing and pay out an incremental length of the cutting filament.

5. The cutterhead of claim 2, said indexing means further including first stop means for limiting the swing of said lever after leaving said latching position thereby defining a specific angular location of said latching lever for said release position.

6. A cutterhead for a rotatably-driven vegetation cutter apparatus defining a drive axis about which the cutterhead is rotatably driven, the cutterhead comprising:

a housing adapted to be rotatively driven by the vegetation cutter apparatus about said axis;

said housing having a hub formed thereon so as to extend along said axis;

a spool defining a radial outer region and being rotatably journalled on said hub for carrying a flexible cutting filament wound thereon;

indexing means for permitting an incremental rotation of said spool relative to said housing to pay out incremental lengths of the cutting filament, said indexing means including:

a plurality of switching cams arranged on said spool in said radial outer region thereof so as to cause said cams and said hub to conjointly define an annular space concentric to said axis;

a pivot lug fixedly mounted on said housing so as to be parallel to said axis;

a latching lever pivotally mounted on said pivot lug so as to be pivotally movable between a latching position wherein said latching lever is in contact engagement with one of said cams so as to prevent a rotational movement of said spool with respect to said housing and a release position into which said lever is moved in dependence on centrifugal force to release said spool for movement relative to said housing to pay out an incremental length of the filament;

said pivot lug being mounted on said housing so as to cause said pivot lug and said latching lever to be arranged in said annular space between said hub and said cams;

said latching lever being a two-arm lever having first and second arms extending outwardly from said pivot lug in respective directions, said first arm having a stop face formed thereon and each of said cams having a counter face formed thereon for coacting with said stop face when said latching lever is in said latching position; and, said second arm being a reset arm for responding to centrifugal force so as to cause a pivotal movement of said latching lever into said release position;

said indexing means further including first stop means for limiting the swing of said lever after leaving said latching position thereby defining a specific angular location of said latching lever for said release position; and, said stop means including a limit face formed on said latching lever and an inner cam formed on said housing for receiving said limit face thereon when said latching lever moves into said release position.

7. The cutterhead of claim 6, said inner cam being a radially extending cam formed on said hub.

8. The cutterhead of claim 2, said indexing means further including second stop means for limiting the swing of said latching lever when said latching lever moves into said latching position.

9. The cutterhead of claim 8, said second stop means including a second limit face formed on said latching lever and an additional counter face formed on each one of said cams for receiving said second limit face thereagainst when said latching lever is in said latching position.

10. The cutterhead of claim 2, said reset arm being longer than said first arm.

11. The cutterhead of claim 2, said housing having a base wall facing toward said apparatus; said spool having an upper flange facing toward said base wall; said spool having a peripheral rim extending upwardly from said flange in surrounding relationship to said hub so as to be concentric with said axis and so as to surround said latching lever.

12. A cutterhead for a rotatably-driven vegetation cutter apparatus defining a drive axis about which the cutterhead is rotatably driven, the cutterhead comprising:
a housing adapted to be rotatively driven by the vegetation cutter apparatus about said axis;
said housing having a hub formed thereon so as to extend along said axis;
a spool defining a radial outer region and being rotatably journalled on said hub for carrying a flexible cutting filament wound thereon;
indexing means for permitting an incremental rotation of said spool relative to said housing to pay out incremental lengths of the cutting filament, said indexing means including:
a plurality of switching cams arranged on said spool in said radial outer region thereof so as to cause said cams and said hub to conjointly define an annular space concentric to said axis;
a pivot lug fixedly mounted on said housing so as to be parallel to said axis;
a latching lever pivotally mounted on said pivot lug so as to be pivotally movable between a latching position wherein said latching lever is in contact engagement with one of said cams so as to prevent a rotational movement of said spool with respect to said housing and a release position into which said lever is moved in dependence on centrifugal force to release said spool for movement relative to said housing to pay out an incremental length of the filament;
said pivot lug being mounted on said housing so as to cause said pivot lug and said latching lever to be arranged in said annular space between said hub and said cams;
said latching lever being a two-arm lever having first and second arms extending outwardly from said pivot lug in respective directions, said first arm having a stop face formed thereon and each of said cams having a counter face formed thereon for coacting with said stop face when said latching lever is in said latching position; and, said second arm being a reset arm for responding to centrifugal force so as to cause a pivotal movement of said latching lever into said release position;
said housing having a base wall facing toward said apparatus;
said spool having an upper flange facing toward said base wall;
said spool having a peripheral rim extending upwardly from said flange in surrounding relationship to said hub so as to be concentric with said axis and so as to surround said latching lever;
said peripheral rim defining an inner wall surface facing toward said lever; and,
said switching cams being formed on said inner wall surface as radially inwardly extending projections.

13. The cutterhead of claim 1, said cams being disposed in said radial outer region one next to the other at equal spacings along a circle concentric to said hub.

14. The cutterhead of claim 1, said housing defining a pass-through opening for passing said cutting filament out of said housing; said cutting filament being taken from said spool at a predetermined take-off location; and, a redirecting yoke mounted in said housing between said take-off location and said opening for guiding said cutting filament.

15. The cutterhead of claim 14, said yoke having a rounded cross section.

16. The cutterhead of claim 14, said housing being subdivided into four quadrants with a first quadrant having one of its radial borders extending through said opening and a second quadrant being adjacent said first quadrant; and, said cutterhead having two yokes arranged in corresponding ones of said quadrants.

17. The cutterhead of claim 14, said redirecting yoke being a wire yoke and said housing having two openings formed therein for mounting said wire yoke.

18. The cutterhead of claim 17, the housing including third and fourth quadrants adjacent said second and third quadrants, respectively, said cutterhead being rotatable in both clockwise and counterclockwise directions and said housing having two additional openings formed in at least one of said third and fourth quadrants for receiving a wire redirecting yoke therein.

19. The cutterhead of claim 2, said latching lever being reversibly mountable on said pivot lug and each of said cams having a second counter face formed thereon for accommodating a change in rotational direction of said cutterhead.

20. The cutterhead of claim 1, further including a second pivot lug fixedly mounted on said housing and a second latching lever pivotally mounted on said second pivot lug; and, interlocking means for synchronously connecting said latching levers to each other.

21. The cutterhead of claim 20, said interlocking means including a toothed ring rotatably mounted on said hub; and, teeth means formed on each one of said latching levers for meshing with said toothed ring.

22. The cutterhead of claim 21, said latching levers being identical to one another.

23. The cutterhead of claim 20, said latching levers being mounted in said annular space so as to be symmetrically arranged with respect to each other.

24. A cutterhead for a rotatably-driven vegetation cutter apparatus defining a drive axis about which the cutterhead is rotatably driven, the cutterhead comprising:
a housing adapted to be rotatively driven by the vegetation cutter apparatus about said axis;
said housing having a hub formed thereon so as to extend along said axis;
a spool defining a radial outer region and being rotatably journalled on said hub for carrying a flexible cutting filament wound thereon;

indexing means for permitting an incremental rotation of said spool relative to said housing to pay out incremental lengths of the cutting filament, said indexing means including:

a plurality of switching cams arranged on said spool in said radial outer region thereof so as to cause said cams and said hub to conjointly define an annular space concentric to said axis;

a pivot lug fixedly mounted on said housing so as to be parallel to said axis;

a latching lever pivotally mounted on said pivot lug so as to be pivotally movable between a latching position wherein said latching lever is in contact engagement with one of said cams so as to prevent a rotational movement of said spool with respect to said housing and a release position into which said lever is moved in dependence on centrifugal force to release said spool for movement relative to said housing to pay out an incremental length of the filament;

said pivot lug being mounted on said housing so as to cause said pivot lug and said latching lever to be arranged in said annular space between said hub and said cams;

said housing having a base wall facing toward said apparatus and said spool having an upper flange facing toward said base wall; and, said cams being formed on said spool so as to extend upwardly from said flange in surrounding relationship to said hub so as to be concentric with said axis.

25. The cutterhead of claim 24, said cams and said latching lever being disposed in a single plane transverse to said axis.

* * * * *